US012752539B2

(12) United States Patent
Onishi

(10) Patent No.: US 12,752,539 B2
(45) Date of Patent: Oct. 6, 2026

(54) CUSHIONING MEMBER AND INK SUPPLY DEVICE

(71) Applicant: KYOCERA Document Solutions Inc., Osaka (JP)

(72) Inventor: Yuzo Onishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 154 days.

(21) Appl. No.: 18/356,998

(22) Filed: Jul. 21, 2023

(65) Prior Publication Data

US 2024/0034069 A1 Feb. 1, 2024

(30) Foreign Application Priority Data

Jul. 26, 2022 (JP) ................................ 2022-119033

(51) Int. Cl.
*B41J 2/175* (2006.01)

(52) U.S. Cl.
CPC ................................ *B41J 2/17506* (2013.01)

(58) Field of Classification Search
CPC .... B41J 2/175; B41J 2/17506; B41J 2/17509; B41J 2/17513; B41J 2002/17516; B41J 29/13
See application file for complete search history.

(56) References Cited

U.S. PATENT DOCUMENTS 6,609,789 B1 * 8/2003 Hunt .................... B41J 2/17513 347/86
9,440,755 B2 * 9/2016 Aoki .................... B41J 2/17559
2015/0375513 A1 * 12/2015 Nishimura ........... B41J 2/17523 347/86

FOREIGN PATENT DOCUMENTS

JP H09-109413 A 4/1997
JP 2002-331684 A 11/2002
JP 2007-083680 A 4/2007
JP 2010-149461 A 7/2010

OTHER PUBLICATIONS

An Office Action; mailed by the China National Intellectual Property Administration of the People's Republic of China on Oct. 17, 2025, which corresponds to Chinese Patent Application No. 202310899083.1 and is related to U.S. Appl. No. 18/356,998.

* cited by examiner

*Primary Examiner* — Anh T Vo
(74) *Attorney, Agent, or Firm* — Studebaker Brackett PLLC

(57) ABSTRACT

A cushioning member according to the present disclosure includes a first member and a second member. The first member has a first recess shaped along a lower portion of an ink-filled ink pack. The second member has a second recess shaped along an upper portion of the ink pack. The ink pack is stored in a space formed by facing the first recess and the second recess. The ink pack is attached to an ink supply device in a state where it is placed on the first member.

2 Claims, 10 Drawing Sheets

CUSHIONING MEMBER AND INK SUPPLY DEVICE

INCORPORATION BY REFERENCE

This application is based on and claims the benefit of priority from Japanese patent application No. 2022-119033 filed on Jul. 26, 2022, which is incorporated by reference in its entirety.

BACKGROUND

The disclosure relates to a cushioning member which protects an ink pack and an ink supply device which supplies an ink.

In an inkjet recording apparatus, it is common to use a replaceable ink container. By preparing the ink container filled with an ink in advance, the ink can be replenished quickly and easily. For example, there is a recording device including a carriage to which an ink cartridge can be attached, a recording means which moves the carriage to record on a recording sheet, a conveyance means which conveys the recording sheet, and a lid member which can be opened and closed to replace the ink cartridge attached to the carriage.

For the ink container, a flexible bag-shaped ink pack is used, but the ink pack filled with the ink is difficult to attach it because its shape is easy to be changed and difficult to hold it. In addition, since the posture and shape of the ink pack are easily changed when it is attached, the ink may remain in the ink pack without being sucked out sufficiently. It takes a lot of work to adjust the posture and shape in order not to remain the ink. In addition, the ink pack may be damaged by contact with the members of the inkjet recording device during the attachment, resulting in leakage of the ink. To solve these problems, the conventional ink container may include a housing in which the ink pack is housed. However, in a case where the casing is omitted to reduce cost, a means to overcome the above problems is needed in place of the casing. These problems are particularly serious in a large-capacity ink supply device that supplies the ink to the inkjet recording device from the outside.

SUMMARY

A cushioning member according to the present disclosure includes a first member and a second member. The first member has a first recess shaped along a lower portion of an ink-filled ink pack. The second member has a second recess shaped along an upper portion of the ink pack. The ink pack is stored in a space formed by facing the first recess and the second recess. The ink pack is attached to an ink supply device in a state where it is placed on the first member.

An ink supply device according to the present disclosure includes an attachment part shaped along an outer surface of the first member of the cushioning member.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, a cushioning member 70 and an ink supply device 140 according to the embodiment of the present disclosure will be described.

Figure 1:
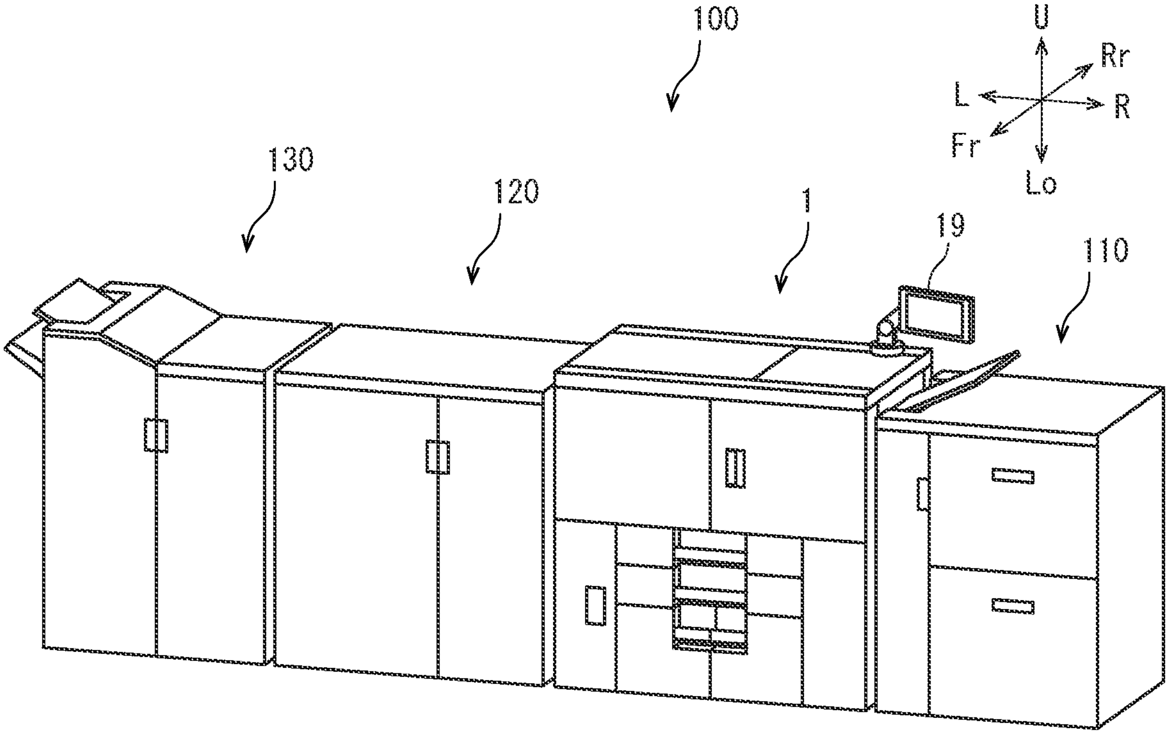
FIG. 1 is a perspective view showing an appearance of an image forming system according to one embodiment of the present disclosure.
Figure 2:
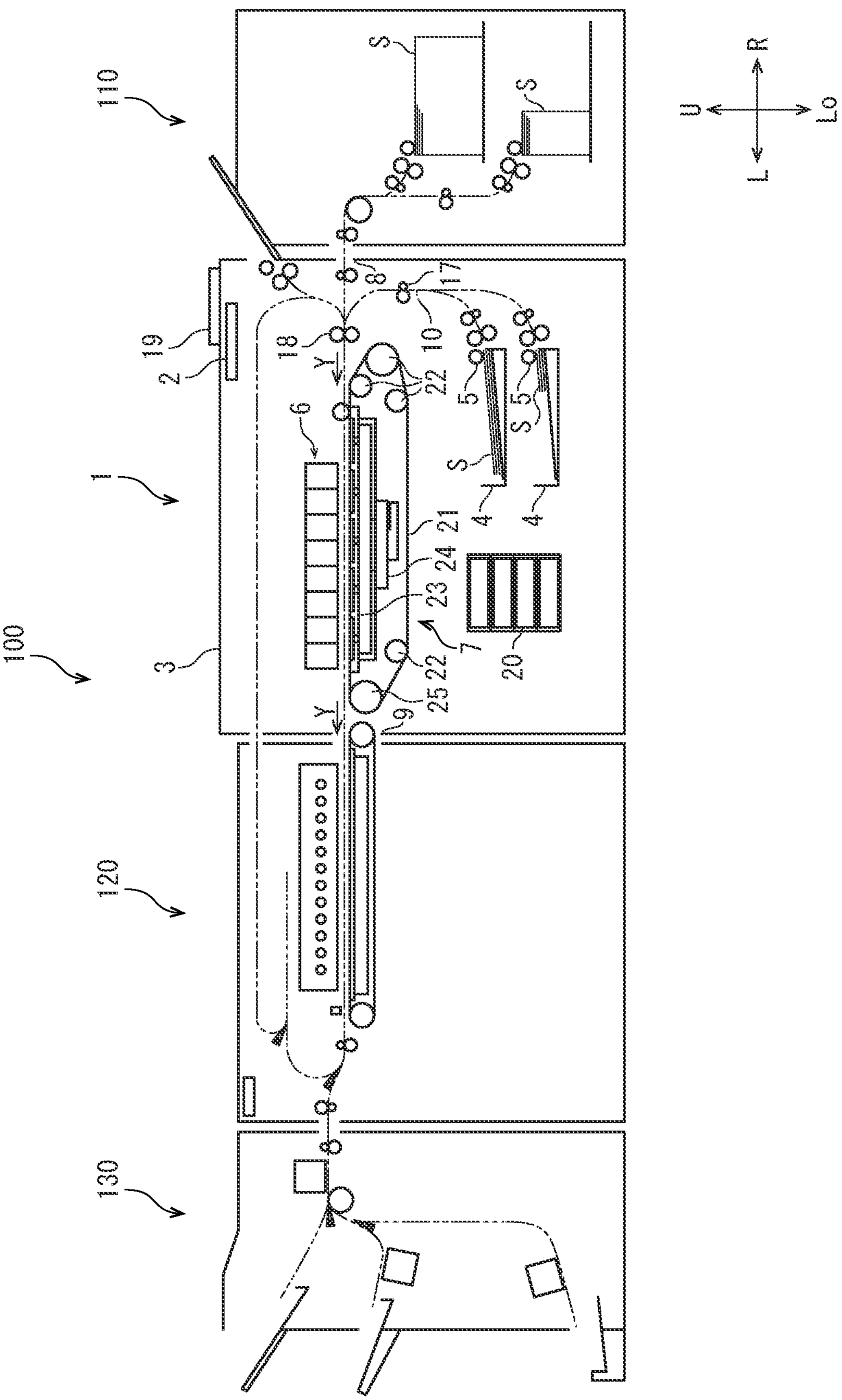
FIG. 2 is a front view schematically showing an inside of the image forming system according to the embodiment of the present disclosure.
Figure 3:
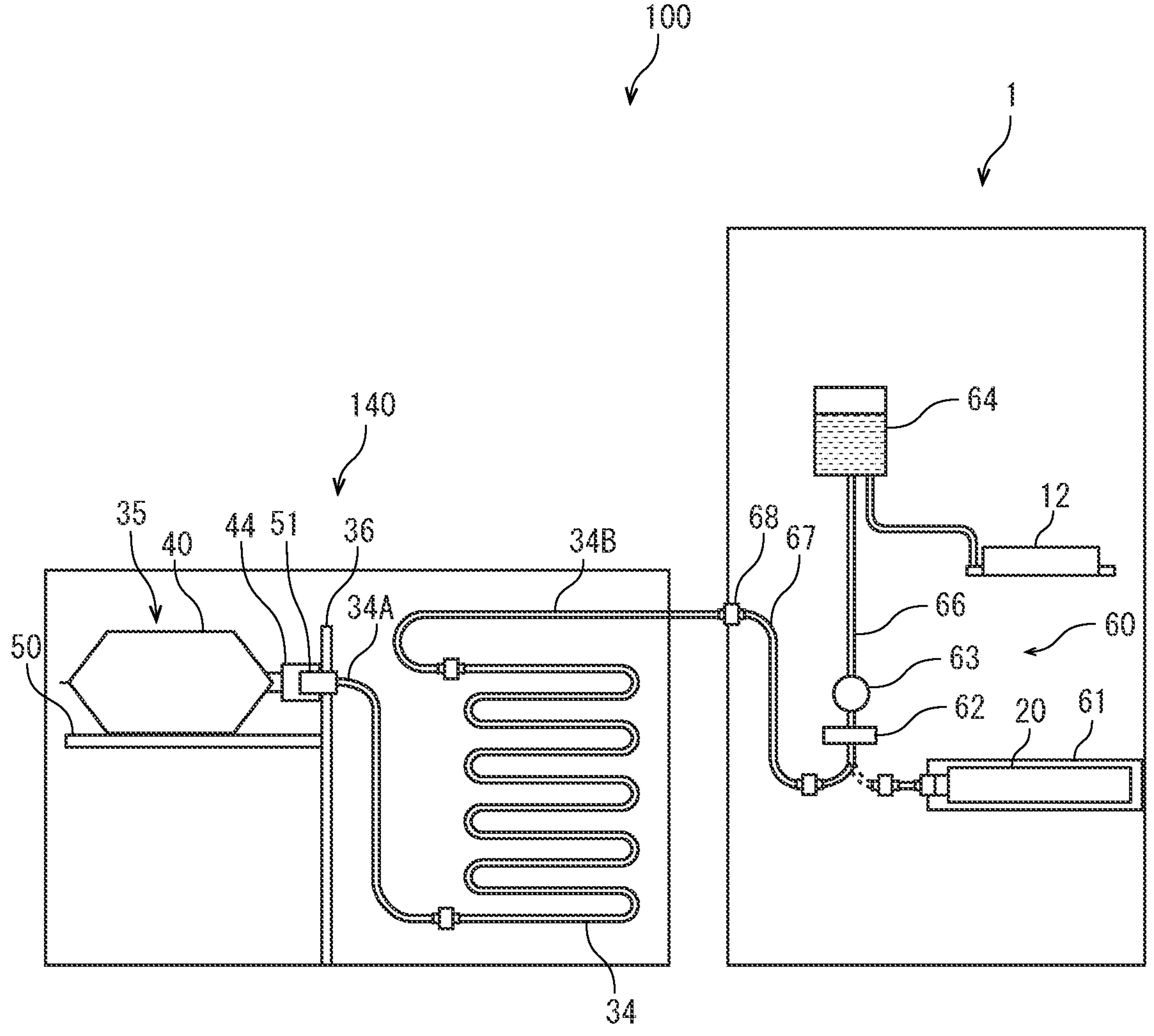
FIG. 3 is a view schematically showing an ink supply path according to the embodiment of the present disclosure.

First, the entire structure of an image forming system 100 will be described. FIG. 1 is a perspective view showing the appearance of the image forming system 100. FIG. 2 is a front view schematically showing the inside of the image forming system 100. FIG. 3 is a view schematically showing an ink supply path 60. Hereafter, the front side of the paper plan on which FIG. 1 is drawn is defined as a front side of the image forming system 100, and the left-and-right direction is defined based on a case where the image forming system 100 is viewed from the front side. In each figure, U, Lo, L, R, Fr and Rr indicate the upper, lower, left, right, front and rear, respectively.

The image forming system 100 (see FIG. 2 and FIG. 3) includes a sheet feeding device 110, an inkjet recording device 1, a drying device 120, and a post-processing device 130. The sheet feeding device 110 includes a large-capacity sheet feeding deck that can houses thousands of sheets S, and supplies the sheets S to the inkjet recording device 1. The inkjet recording device 1 forms an image on the sheet S by an inkjet method. The drying device 120 heats and dries the ink ejected on the sheet S. The post-processing device 130 performs post-processing such as punching, stapling and folding on the sheet S.

The inkjet recording device 1 includes a box-shaped body housing 3. In the lower portion of the body housing 3, a sheet feeding cassette 4 in which the sheets such as a plain paper and a coated paper are housed, and a sheet feeding roller 5 which feeds the sheet S from the sheet feeding cassette 4 are provided. Above the sheet feeding cassette 4, a conveyance unit 7 is provided which attracts the sheet S and conveys it in the Y direction. Above the conveyance unit 7, an image forming unit 6 is provided, which ejects an ink and forms an image. In the upper right portion of the main body housing 3, a discharge roller 8 which discharges the image-formed sheet S and a discharge tray 9 on which the discharged sheets S are stacked are provided.

Inside the body housing 3, a conveyance path 10 is provided from the sheet feeding roller 5 through a gap between the conveyance unit 7 and the image forming unit 6 to the discharge roller 8. The conveyance path 10 is formed mainly by plate-like members facing each other with a gap for passing the sheet S. On the conveyance path 10, conveyance rollers 17 for holding and conveying the sheet S are provided at multiple positions in the conveyance direction Y. A registration roller 18 is provided upstream of the image forming unit 6 in the conveyance direction Y.

The conveyance unit 7 includes an endless conveyance belt 21, a support plate 23, and a suction part 24. The conveyance belt 21 has a number of vent holes (not shown), and is wound around a drive roller 25 and a driven roller 22. The support plate 23 has a number of vent holes, and the upper surface is in contact with the inner surface of the conveyance belt 21. The suction part 24 attracts the sheet S to the conveyance belt 21 by sucking air through the vent holes of the support plate 23 and the vent holes of the conveyance belt 21. When the drive roller 25 is driven in the counterclockwise direction by a drive unit (not shown) including a motor and a reduction gear, the conveyance belt 21 travels in the counterclockwise direction, and the sheet S attracted to the conveyance belt 21 is conveyed in the Y direction.

The inkjet recording device 1 includes an ink supply path 60 (see FIG. 3). Since four colors of the ink are used in this embodiment, four ink supply paths 60 are provided, but in the figure, the ink supply path 60 corresponding to one color of the ink is shown. The inkjet recording device 1 includes a container attachment part 61 to which an ink container 20 is attached, a filter 62 which filters the ink, a pump 63 which pumps up the ink from the ink container 20 through the filter 62, and a sub-tank 64 in which the ink fed from the pump 63 is stored.

The image forming unit 6 includes head units 11Y, 11Bk, 11C and 11M (collectively referred to as the head unit 11) and ejects yellow, black, cyan and magenta ink, respectively. The ink containers 20Y, 20Bk, 20C and 20M (collectively referred to as the ink container 20) filled with the yellow, black, cyan and magenta ink are connected to the head units 11Y, 11Bk, 11C and 11M, respectively.

The head unit 11 includes one or more inkjet heads 12, for example, three inkjet heads 12 arranged in a staggered manner. The inkjet head 12 includes a parallelepiped housing whose longitudinal direction is along the front-and-rear direction, and a nozzle plate provided at the bottom portion of the housing (not shown). The nozzle plate has a number of nozzles lined up in the front-and-rear direction. The nozzle has a branched flow path branching from a flow path connected to the sub-tank 64 and an ejection port provided on the nozzle surface. A vibration plate forms a part of the inner wall of the branched flow path. The vibration plate includes a pressurizing element. In the housing, a driver to drive the pressurizing element and a control circuit to control the driver are provided. As the pressurizing element, a piezoelectric element, an electrostatic element (electrostatic actuators, a heating element (used in thermal inkjet system) or the like are used.

The control part 2 includes an arithmetic part and a storage part (not shown). The arithmetic part is, for example, a CPU (Central Processing Unit). The storage part includes a storage media such as a ROM (Read Only Memory), a RAM (Random Access Memory) and a EEPROM (Electrically Erasable Programmable Read Only Memory). The arithmetic part performs various processes by reading and executing the control program stored in the storage part. The control part 2 may be realized by an integrated circuit without using software.

A display operation part 19 is provided on the upper portion of the body housing 3. The display operation part 19 includes a display panel, a touch panel provided superimposed on the display surface of the display panel, and a keypad (not shown). The control part 2 displays a screen showing the operation menu, status or the others of the inkjet recording device 1 on the display panel, and controls each part of the inkjet recording device 1 according to the operation detected by the touch panel and keypad.

The basic image forming operation of the inkjet recording device 1 is as follows. When an image forming job is input to the inkjet recording device 1 from the display operation part 19 or an external computer, the sheet feeding roller 5 feeds the sheet S from the sheet feeding cassette 4 to the conveyance path 10, and the registration roller 18, whose rotation has been stopped, corrects the skew of the sheet S. When the registration roller 18 feeds the sheet S to the conveyance unit 7 at a predetermined timing, the conveyance unit 7 attracts the sheet S to the conveyance belt 21 and conveys it in the Y direction. When the control part 2 supplies raster-type image data to the control circuit in synchronization with the conveyance of the sheet S, the driver supplies an ejection signal corresponding to the gradation data to the pressurizing element, and the ink is ejected from the nozzle to form an image on the sheet S. The discharge roller 8 discharges the sheet S on which the image is formed to the discharge tray 9.

Figure 4:
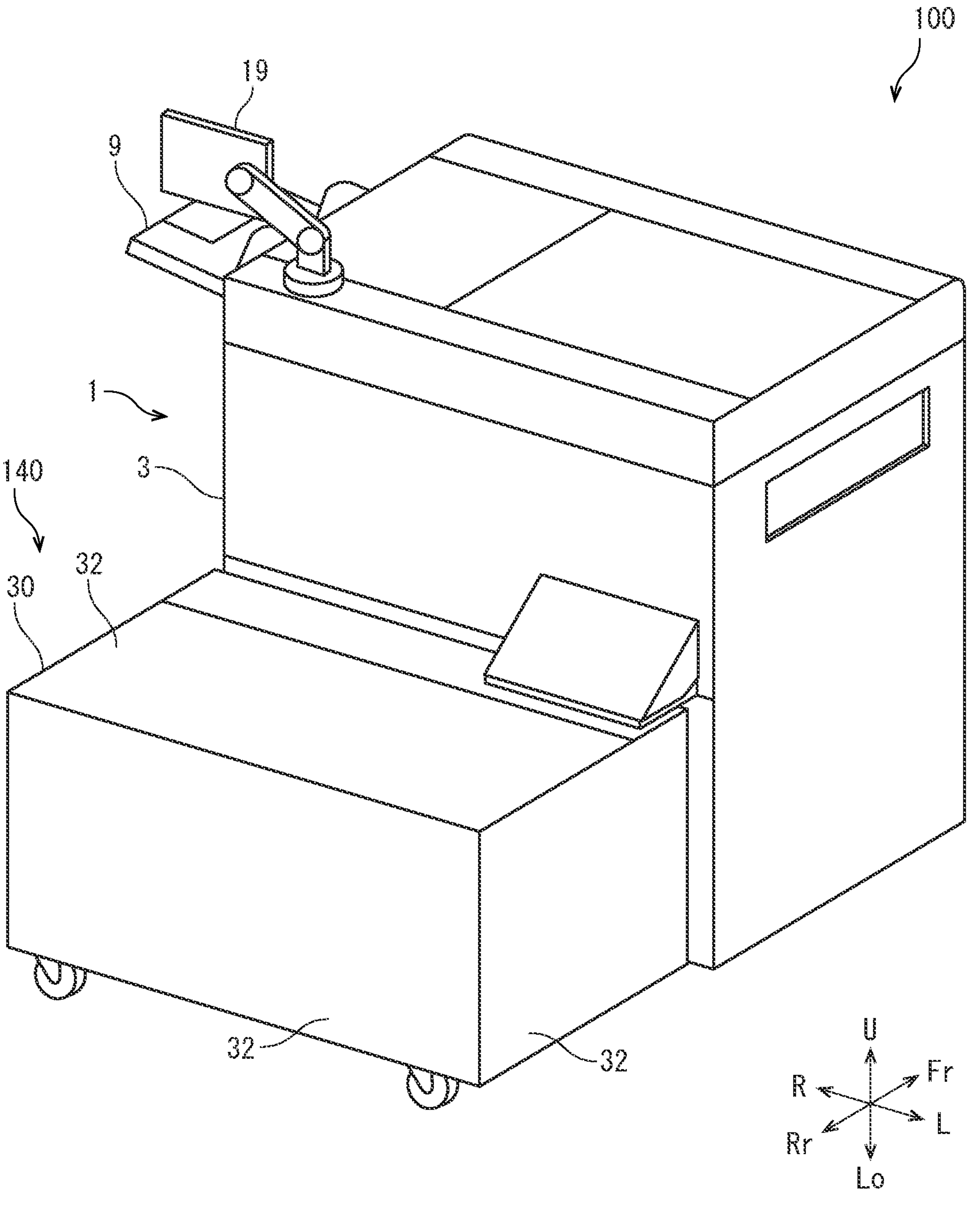
FIG. 4 is a perspective view showing an appearance of an ink supply device according to one embodiment of the present disclosure.
Figure 5:
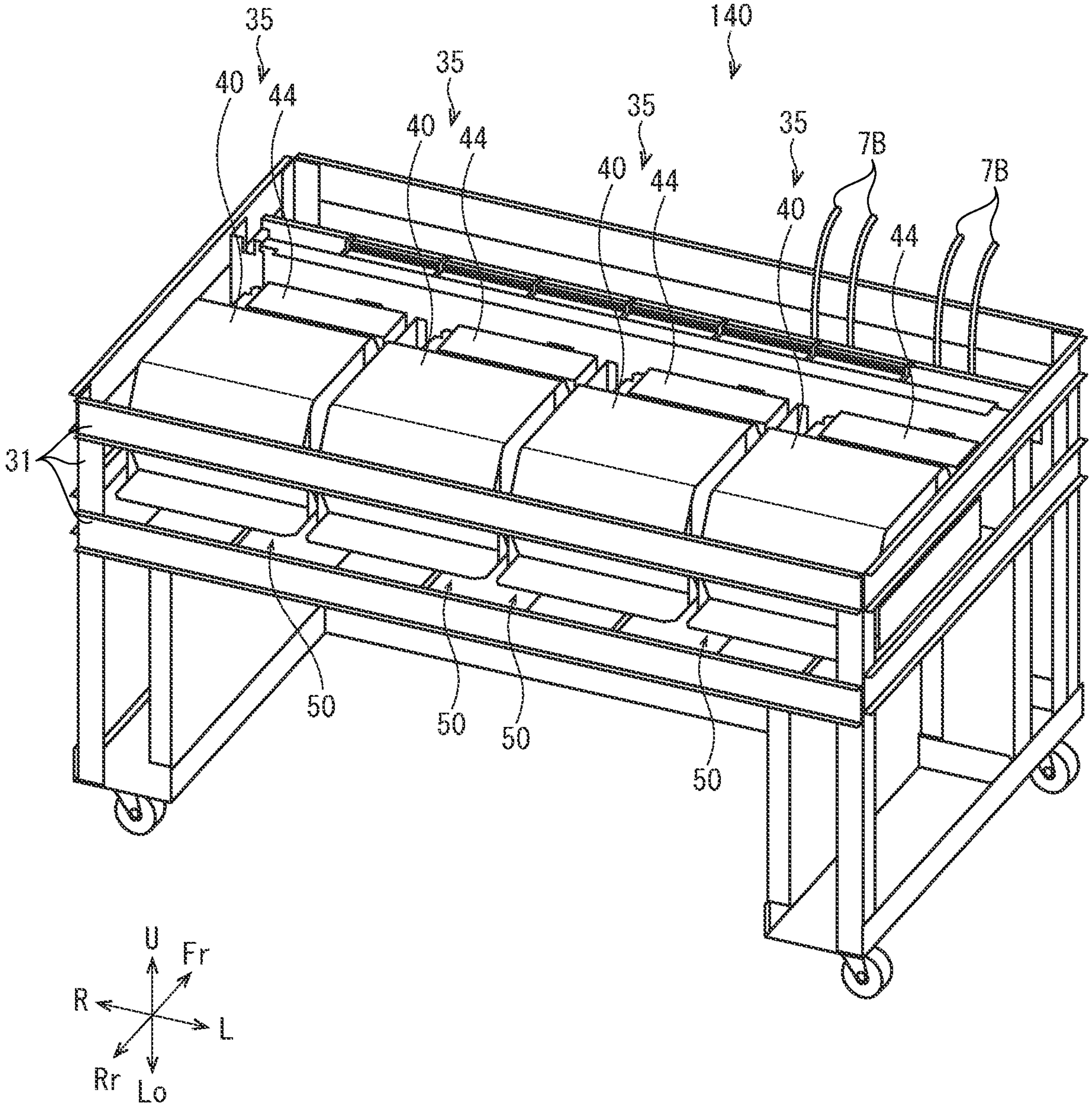
FIG. 5 is a perspective view showing an inner structure of the ink supply device according to the embodiment of the present disclosure.

[Ink Supply Device] Next, the configuration of the ink supply device 140 will be described (see FIG. 3 to FIG. 5). FIG. 4 is a perspective view showing the appearance of the ink supply device 140. FIG. 5 is a perspective view showing the inside of the ink supply device 140. The ink supply device 140 includes a housing four attachment parts 50, and four ink packs 35.

The housing 30 has a frame 31 (see FIG. 5) in which metal columns, beams and the others are assembled in a rectangular box shape, and exterior plates 32 (see FIG. 4) forming the side and upper surfaces of the housing 30. The four attachment parts 50 are arranged in the left-and-right direction in the upper portion in the housing 30. The attachment parts 50 are supported by the frame 31.

A tube 34 (see FIG. 3) is, for example, a stainless steel tube, formed in a regularly meandered shape. The ink supply device 140 includes a heater (not shown) to heat the ink passing through the tube 34. One end of the tube 34 is connected to the ink pack 35 via an upstream connection tube 34A. The other end of the tube 34 is connected to a coupling 68 of the inkjet recording device 1 via a downstream connection tube 34B.

Figure 6:
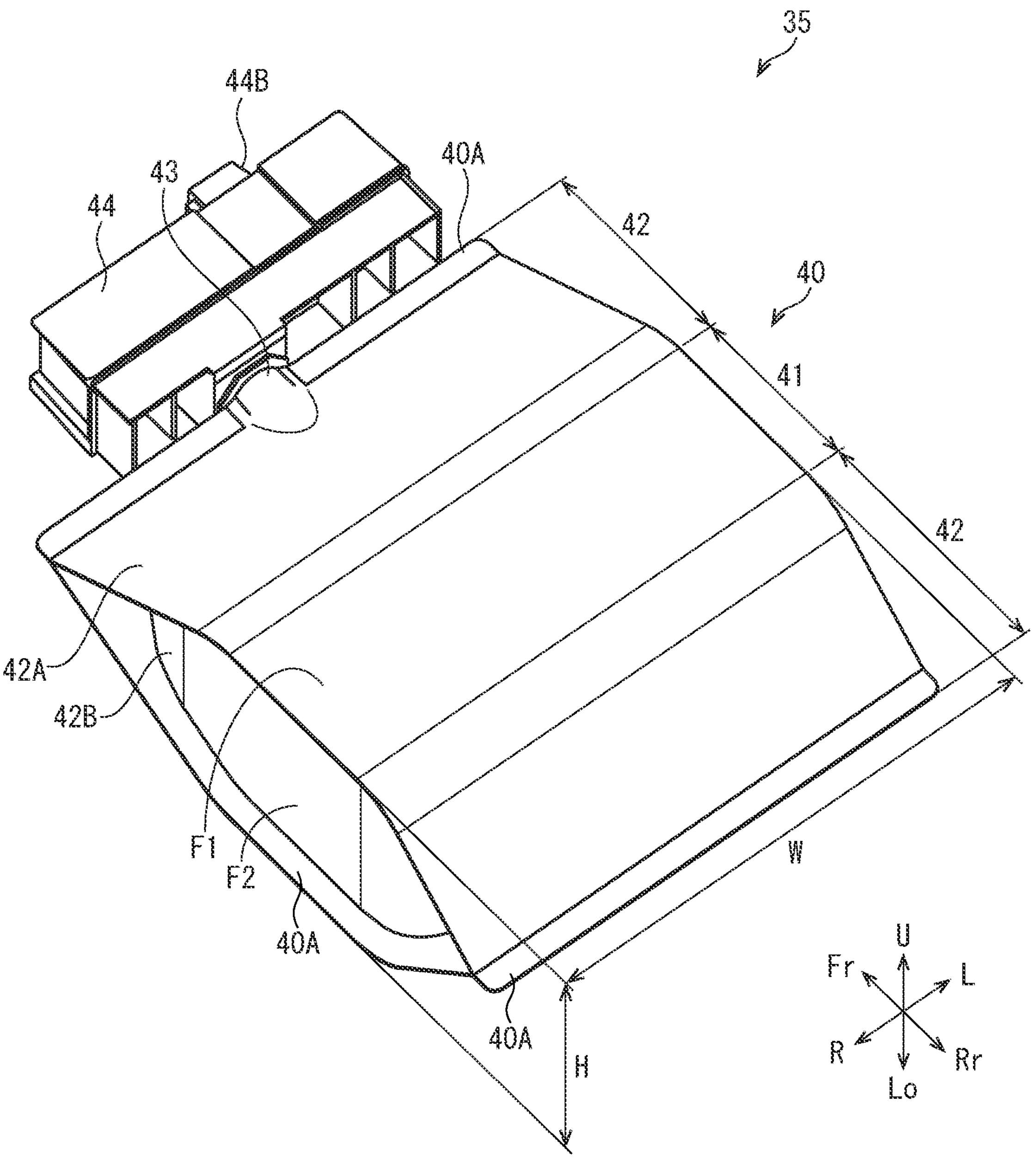
FIG. 6 is a perspective view showing an ink pack according to the embodiment of the present disclosure.
Figure 7:
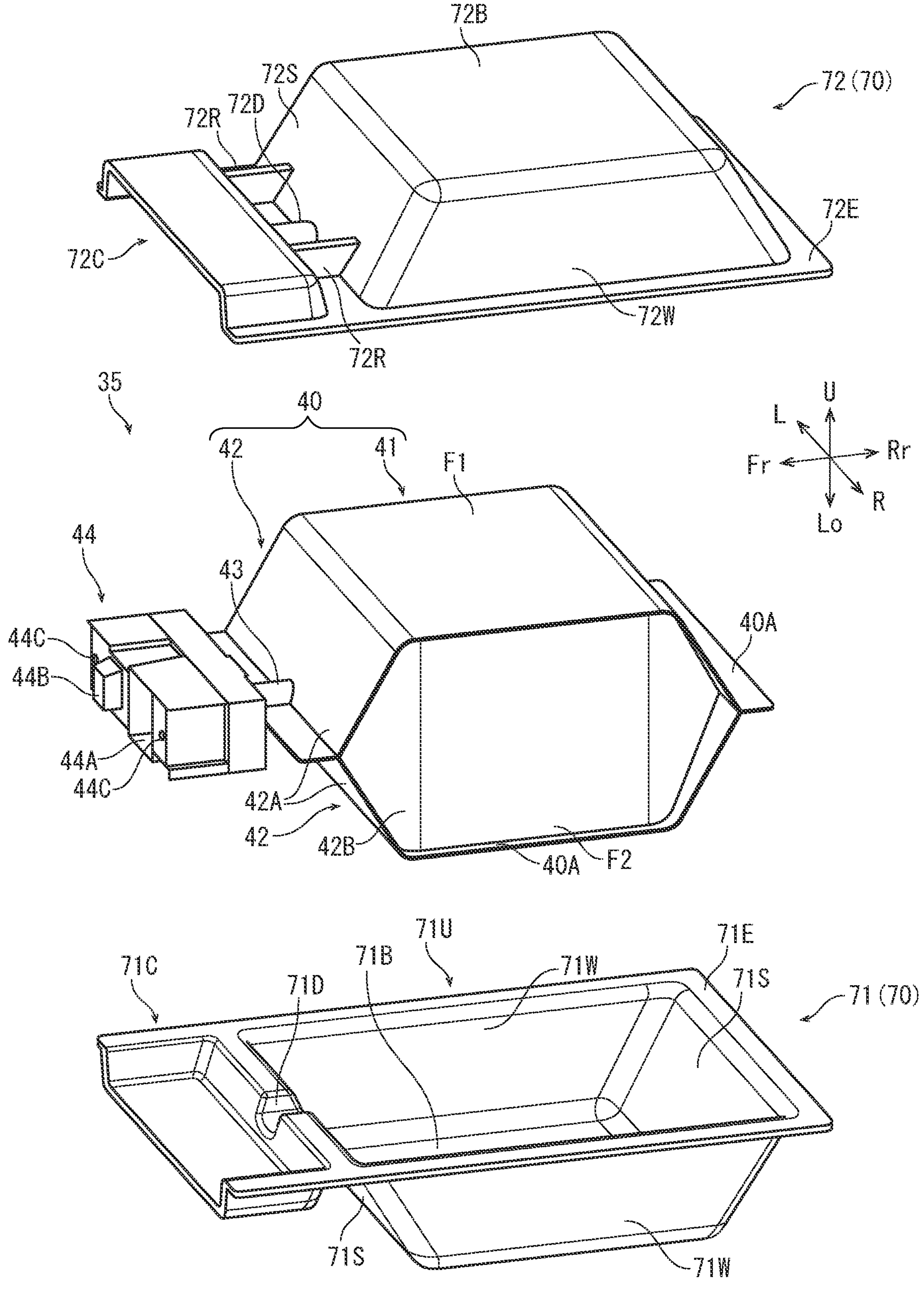
FIG. 7 is a perspective view showing a pair of cushioning members and the ink pack according to the embodiment of the present disclosure.

[Ink Pack] FIG. 6 is a perspective view showing the ink pack 35. FIG. 7 is a perspective view showing a pair of cushioning members 70 and the ink pack 35. The ink pack 35 has a pack body 40, a spout 43, and a pack connection part 44.

[Pack Body] The pack body 40 is formed into a bag shape by joining flexible films F1 and F2. The films F1 and F2 forming the pack body 40 are laminated films in which multiple layers are laminated. For example, the films F1 and F2 each has a four-layer structure in which layers of polyethylene, aluminum, polyamide (nylon) and polyethylene terephthalate are laminated sequentially from the inner layer to the outer layer. The films F1 and F2 are not limited to the above structures, as long as they are flexible materials that can block light, air (odor), moisture and the like.

The pack body 40 is formed by joining the upper and lower films F1 formed in a rectangular shape and the left and right films F2 formed in a hexagonal shape along their outer circumferential edges to form a bag with a gusset. Around the outer circumferential edge of the pack body 40, a belt-shaped joined part 40A is formed in which the films F1 and F2 are overlapped and joined. The films F1 and F2 are preferably joined by heat melting and pressure-joining, but this is not limited to this, and they may be joined using an adhesive or double-sided tape.

The pack body 40 has a torso part 41 that forms a square cylindrical shape when the ink is contained, and a pair of sealing parts 42 that seal both ends of the torso part 41 in the axial direction of the torso part 41 (the front-and-rear direction). The sealing part 42 is formed in a gable roof shape having a pair of flat parts 42A facing each other in the thickness direction (the upper-and-lower direction) and a pair of gable parts 42B facing each other in the width direction (the direction perpendicular to the axial and thickness directions (the left-and-right direction)). In this specification, "facing" means not only facing each other in a parallel posture but also facing each other in an inclined posture (non-parallel posture).

In a state where the pack body 40 is fully filled with the ink (a full state), the flat parts 42A are inclined so as to be closer each other as separated away from the torso part 41 in the axial direction. The flat parts 42A are joined at the tip side in the axial direction to form the joined part 40A. In addition, the gable part 42B is formed into a triangular shape so as to be thinner as separated away from the torso part 41 in the axial direction. In the full state, the pack body 40 is formed such that the maximum dimension W (or it may be considered as the dimension in the width direction of the torso part 41) in the width direction of the flat part 42A is longer than the maximum dimension H (or it may be considered as the thickness of the torso part 41) in the thickness direction of the gable part 42B.

[Spout] The pack body 40 has a spout 43 through which the contained ink is discharged. The spout 43 is made of, for example, synthetic resin, and formed in a cylindrical shape. The spout 43 is mounted approximately in the center portion in the width direction of the tip (front end) of one (front) sealing part 42. The spout 43 is fixed to the joined part 40A while being held between the flat parts 42A. That is, the flat parts 42A are also joined to the outer circumferential surface of the spout 43.

[Pack Connection Part] A pack connection part 44 is attached to the tip of the spout 43. The pack connection part 44 is made of hard synthetic resin, for example, and is formed into a parallelepiped shape long in the left-and-right direction. The pack connection part 44 is formed such that its length in the width direction is shorter than the maximum dimension W in the width direction of the flat part 42A and longer than a half of the maximum dimension W. In addition, the pack connection part 44 is formed such that its thickness (height) is shorter than the thickness (H) of the torso part 41. The spout 43 is mounted at a position shifted rightward from the center of the pack connection part 44 in the width direction. That is, the pack connection part 44 is arranged in a position shifted leftward with respect to the pack body 40 (sealing part 42).

The pack connection part 44 (see FIG. 7) has a supply port 44A, a convex part 44B, and hole parts 44C. The supply port 44A is provided in front of the spout 43 and communicates with the spout 43. The convex part 44B is provided on the left side of the supply port 44A. The hole parts 44C are provided on the right side of the supply port 44A and on the left side of the convex part 44B.

Figure 8:
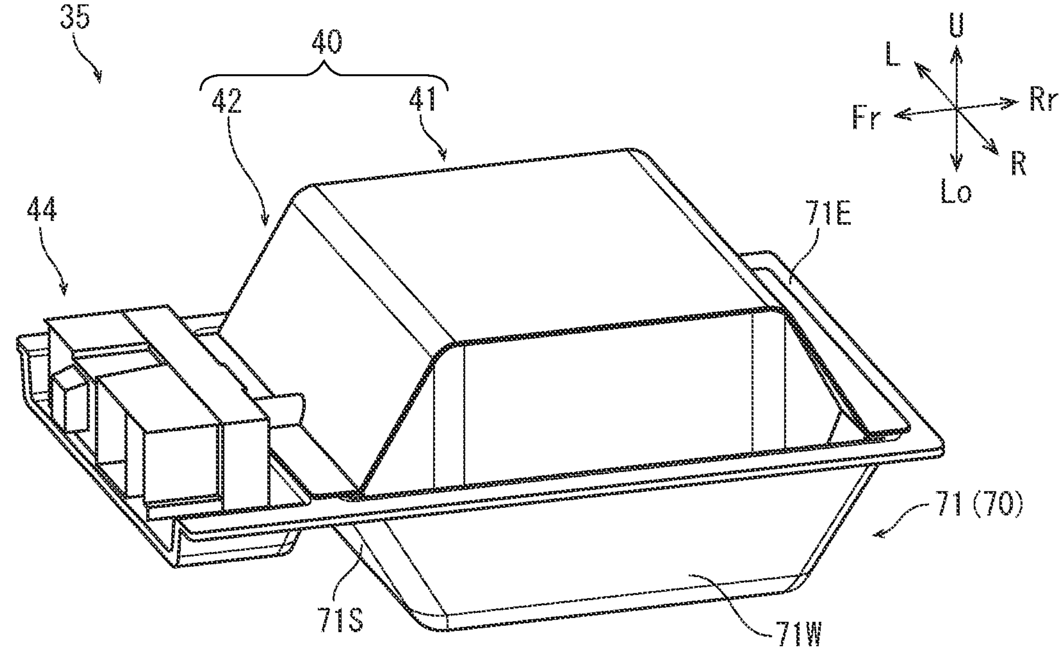
FIG. 8 is a perspective view showing the ink pack placed on a first member according to the embodiment of the present disclosure.
Figure 9:
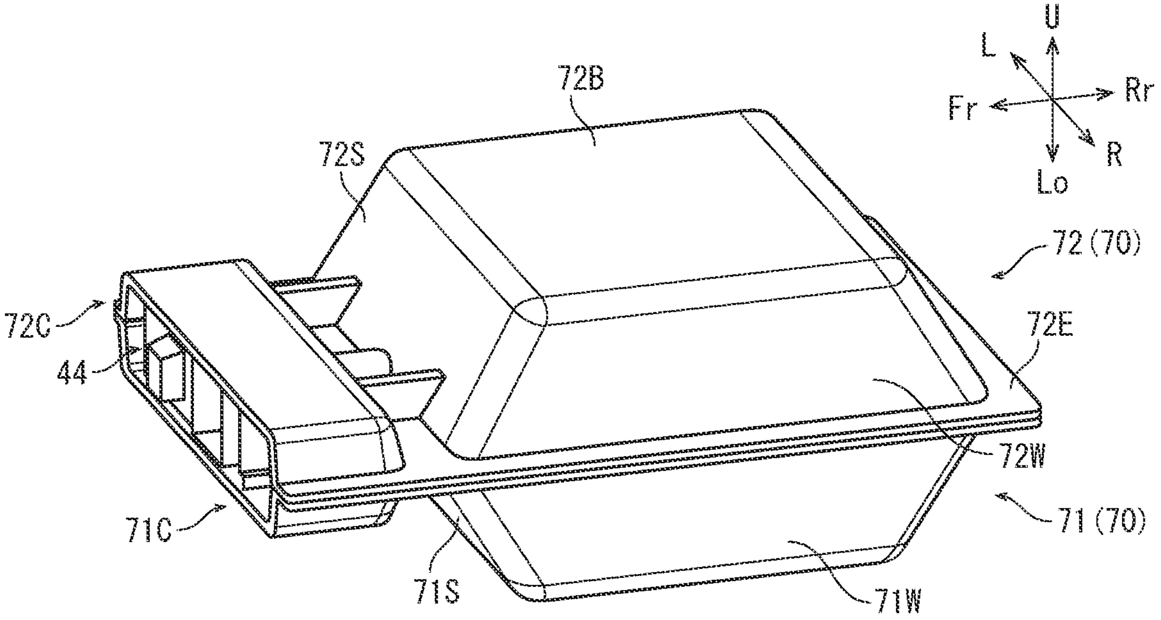
FIG. 9 is a perspective view showing the ink pack housed in the first member and a second member according to the embodiment of the present disclosure.

[Cushioning Member] Next, the configuration of the cushioning member 70 will be described (see FIG. 7 to FIG. 9). FIG. 8 is a perspective view showing the ink pack 35 placed on a first member 71. FIG. 9 is a perspective view showing the ink pack 35 stored in the first member 71 and a second member 72.

The cushioning member 70 according to the embodiment includes a first member 71 having a first recess 71U shaped along the lower portion of the ink-filled ink pack 35 and a second member 72 having a second recess 72U shaped along the upper portion of the ink pack 35. The ink pack 35 is housed in a space formed by facing the first recess 71U and the second recess 72U, and the ink pack 35 is attached to the ink supply device 140 while being placed on the first member 71. Specifically, they are as follows:

[First and second members] The cushioning member 70 (see FIG. 7) includes the first member 71 and the second member 72. The first member 71 and the second member 72 are manufactured, for example, by injection molding of resin. The first member 71 covers the lower portion of the ink pack 35, and the second member 72 covers the upper portion of the ink pack 35. Here, the lower portion of the ink pack 35 refers to the portion below the center in the upper-and-lower direction of the pack body 40, and the upper portion of the ink pack 35 refers to the portion above the center in the upper-and-lower direction of the pack body 40. The center in the upper-and-lower direction of the pack body 40 is a horizontal plane including the joined part 40A (the joined part 40A whose longitudinal direction is along the left-and-right direction) located at the front and rear ends of the joined part 40A of the pack body 40. In this embodiment, the shape of the first member 71 and the shape of the second member 72 are identical. Therefore, the shape of the first member 71 will be mainly described below.

The first recess 71U includes a bottom part 71B, side wall parts 71W, and inclined parts 71S. The bottom part 71B is a rectangular and flat portion that faces the lower surface of the torso part 41 of the pack body 40. The side wall parts 71W are provided above both the left and right end portions of the bottom part 71B, and are generally stood upwardly. The side wall parts 71W are trapezoidal and flat portions that face both the left and right side surfaces of the pack body 40. The side wall part 71W forms a trapezoidal shape with the upper base longer than the lower base. The front edge of the side wall part 71W is inclined forward, and the rear edge of the side wall part 71W is inclined rearward. The inclined parts 71S are provided above both the front and rear end portions of the bottom part 71B. The front inclined part 71S is inclined along the front edges of the side wall parts 71W, and the rear inclined part 71A is inclined along the rear edges of the side wall parts 71W. The edge part 71E of the first recess 71U projects outward in the horizontal direction. The upper surface of the edge part 71E of the first recess 71U is formed in the same plane throughout the entire circumference, and is horizontal.

In front of the first recess 71U, a connection part storage part 71C is provided, in which the pack connection part 44 is stored. The connection part storage part 71C is formed in a concave shape corresponding to the lower portion of the pack connection part 44. The connection part storage part 71C is opened forward. Therefore, when the ink pack 35 is placed on the first member 71, the front surface of the pack connection part 44 is exposed (see FIG. 9). Between the first recess 71U and the connection part storage part 71C, a spout storage part 71D is provided, in which the spout 43 is stored. The spout storage part 71D is formed in a concave shape corresponding to the lower portion of the spout 43.

As described above, the second member 72 has the same shape as the first member 71. That is, the second member 72 includes the second recess 72U, the bottom part 72B, the side wall parts 72W, the inclined parts 72S, the edge part 72E, the connection part storage part 72C and the spout storage part 72D corresponding to the first recess 71U, the bottom part 71B, the side wall parts 71W, the inclined parts 71S, the edge part 71E, the connection part storage part 71C and the spout storage part 71D, respectively. On the lower surface of the edge part 72E between the second recess 72U and the connection part storage part 72C, of the edge part 72E of the second recess 72U, reinforcing ribs 72R connecting the outer surfaces of the front inclined part 72A and the connection part storage part 72C are provided. Although not shown, a similar reinforcing ribs 71R are provided on the first member 71.

The second member 72 is used by turning the first member 71 upside down. The ink pack 35 is stored in a space formed by facing the first recess 71U and the second recess 72U (see FIG. 9). As described above, the upper surface of the edge part 71E of the first recess 71U is on the same plane along the entire circumference, and is formed horizontally. The lower surface of the edge part 72E of the second recess 72U similarly is on the same plane along the entire circumference, and is formed horizontally. In a state where the ink pack 35 is stored in the space formed by facing the first recess 71U and the second recess 72U, the upper surface of the edge part 71E of the first recess 71U and the lower surface of the edge part 72E of the second recess 72U come into contact with each other, and both the edge parts 71E and 72E can be joined.

Since it is necessary to detach the second member 72 in order to attach the ink pack 35, it is desirable to take into consideration the ease of separation as a method of the joining. For example, an adhesive tape (not shown) may be wrapped around both the edge parts 71E and 72E that are brought into contact, or both the edge part 71E and 72E may be held by clips or the like (not shown). Alternatively, snap fit coupling means (not shown) may be provided on both the edge parts 71E and 72E.

Figure 10:
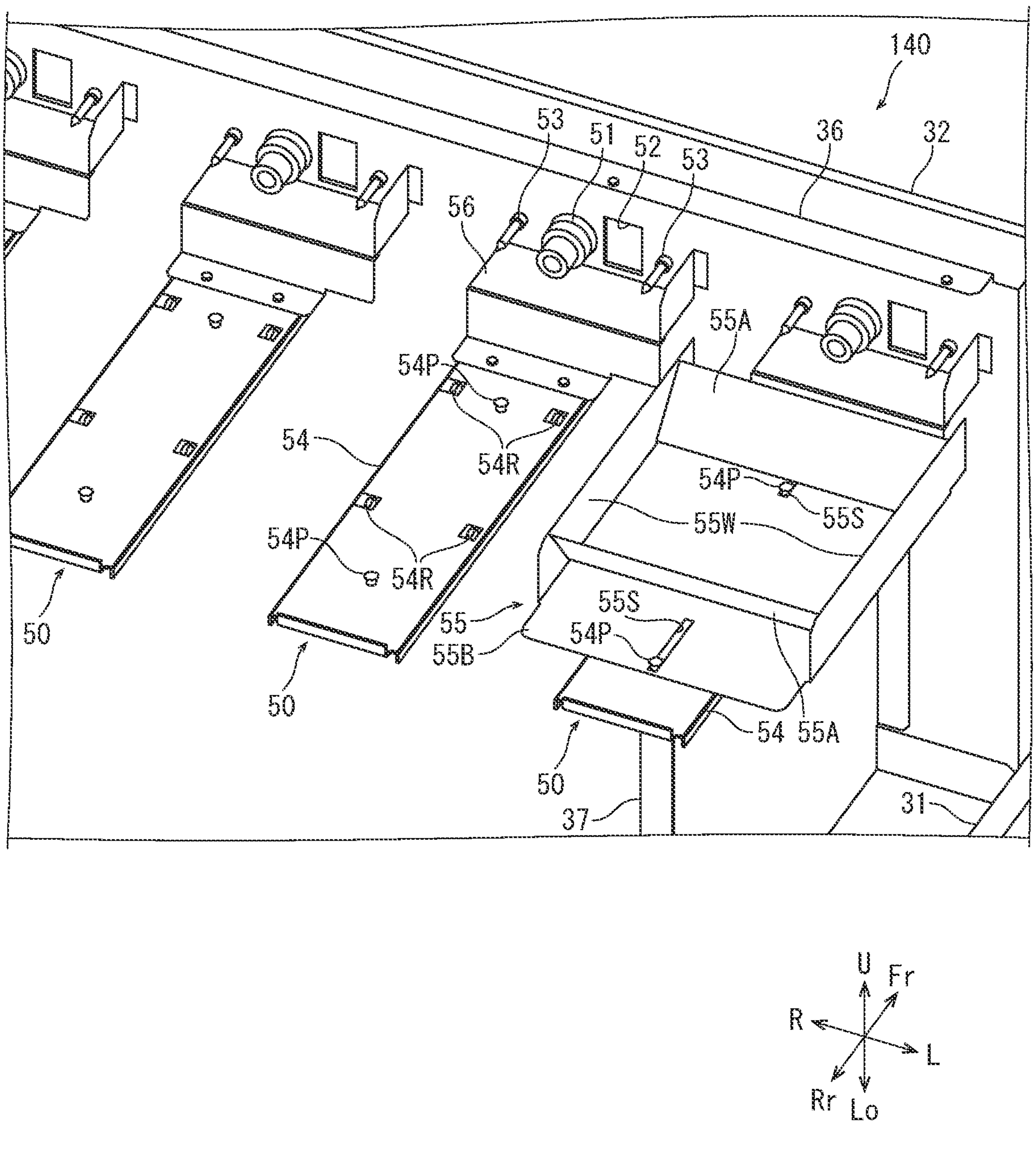
FIG. 10 is a perspective view showing a structure of an attachment part according to the embodiment of the present disclosure.

[Attachment Part] FIG. 10 is a perspective view showing the configuration of the attachment part 50. In FIG. 10, a left rear column frame 31 and a rear and left beam frames 31 are not shown. The attachment part 50 includes four suction ports 51, four carriage support parts 54, and four carriages 55.

[Suction Port] Behind the front exterior plate 32 of the housing 30, an inner wall 36 parallel to the front exterior plate 32 is provided. In the inner wall 36, the suction ports 51, a hole part 52 and a pin 53 are provided. The suction ports 51 are provided at four positions with approximately equal intervals in the left-and-right direction on the upper portion of the inner wall 36. The suction ports 51 are connected to the upstream connection tube 34A. To the suction port 51, the supply port 44A of the pack connection part 44 of the ink pack 35 is connected. The hole part 52 is provided on the left side of the suction port 51. The convex part 44B of the pack connection part 44 is inserted into the hole part 52. The pins 53 are provided on the right side of the suction port 51 and on the left side of the hole part 52. The pins 53 are inserted into the hole parts 44C of the pack connection part 44.

[Carriage Support Part] The carriage support part 54 is provided in front of each of the four suction ports 51. The carriage support part 54 is a rectangular plate-like member whose longitudinal direction is along the front-and-rear direction. The front end portion of the carriage support part 54 is supported by the inner wall 36 through a support member 56 formed in a stepped manner. The rear end portion of the carriage support part 54 is supported by the lower frame 31 of the two rear beam-shaped frames 31 shown in FIG. 5. A pair of left and right rollers 54R is provided at front and rear positions of the carriage support part 54. The roller 54R is rotatable around an axis whose axial direction is along the left-and-right direction. A sliding pin 54P protruding upward is provided at front and rear positions of the carriage support part 54.

[Carriage] The carriage 55 is provided above each of the four carriage support parts 54. In FIG. 10, only the leftmost carriage 55 of the four carriages 55 is shown. The carriage 55 has a bottom part 55B facing the carriage support part 54, side wall parts 55W provided along both the left and right end portions of the bottom part 55B, and an inclined part 55A provided at front and rear positions of the bottom part 55B.

The lower surface of the bottom part 55B comes into contact with the rollers 54R of the carriage support part 54. The bottom part 55B has slits 55S at the front and rear positions along the front-and-rear direction. Inside the slits 55S, the sliding pins 54P of the carriage support part 54 are disposed. The slit 55S and the sliding pin 54P guide the carriage 55 in the front-and-rear direction. The carriage 55 is slidable in the front-and-rear direction within the length of the slit 55S.

The attachment part 50 has a shape along the outer surface of the first member 71. Specifically, the distance between the inner surfaces of the left and right side wall parts 55W is slightly longer than the distance between the outer surfaces of the left and right side wall parts 71W of the first member 71. The front inclined part 55A is inclined so as to be higher forward, and has the same inclination angle as that of the outer surface of the front inclined part 71S of the first member 71. The rear inclined part 55A is inclined so as to be higher rearward, and has the same inclination angle as that of the outer surface of the rear inclined part 71S of the first member 71. The distance between the lower ends of the front and rear inclined parts 55A is slightly longer than the length of the bottom part 71B of the first member 71 in the front-and-rear direction.

The ink pack 35 is installed according to the following procedure. Holding the first member 71 on which the ink pack 35 is placed, by hand, insert the first member 71 into the space formed by the left and right side wall parts 55W and the front and rear inclined parts 55A. With this work, the supply port 44A of the pack connection part 44 faces the suction port 51 of the attachment part 50 in the front-and-rear direction. Also, the convex part 44B of the pack connection part 44 faces the hole part 52 of the attachment part 50, and the hole parts 44C of the pack connection part 44 face the pins 53 of the attachment part 50. When the carriage 55 is moved forward, the convex part 44B is inserted into the hole part 52, the pins 53 are inserted into the hole parts 44C, and the supply port 44A is connected to the suction port 51. Thus, the ink pack 35 is connected to the piping 67 (see FIG. 3) of the inkjet recording device 1 via the tube 34 and the others, and the ink filled in the ink pack 35 can be supplied to the inkjet recording device 1.

According to the cushioning member 70 according to the present embodiment described above, the first member 71 having the first recess 71U shaped along the lower portion of the ink-filled ink pack 35 and the second member 72 having the second recess 72U shaped along the upper portion of the ink pack 35 are provided, and the ink pack 35 is stored in the space formed by facing the first recess 71U and the second recess 72U, and the ink pack 35 is attached to the ink supply device 140 in a state where it is placed on the first member 71. With this configuration, the ink pack 35 can be carried safely and easily. In addition, the ink pack 35 does not need to be touched directly, which makes the ink pack 35 easier to be held by hand. In addition, since the ink pack 35 is attached to the ink supply device 140 while being placed on the first member 71, the work of adjusting the shape of the ink pack 35 is reduced. In addition, since the cushioning member 70 has the function of buffer and the function of assisting the attachment of the ink pack 35, there is no need to newly provide a configuration for assisting the attachment of the ink pack 35. Therefore, according to the present embodiment, the ink pack 35 can be easily attached with a low-cost configuration.

In addition, according to the cushioning member 70 according to the present embodiment, the shape of the first member 71 and the shape of the second member 72 are identical. With this configuration, the cost of the cushioning member 70 can be reduced.

Moreover, according to the cushioning member 70 according to the present embodiment, the first member 71 and the second member 72 can be joined with the ink pack 35 stored in the space formed by facing the first recess 71U and the second recess 72U. With this configuration, the ink pack 35 can be more safely protected.

In addition, according to the ink supply device 140 according to the present embodiment, the attachment part 50 having the shape along the outer surface of the first member 71 is provided. With this configuration, the ink pack 35 can be easily attached to the ink supply device 140.

The above embodiment may be modified as follows.

Figure 11:
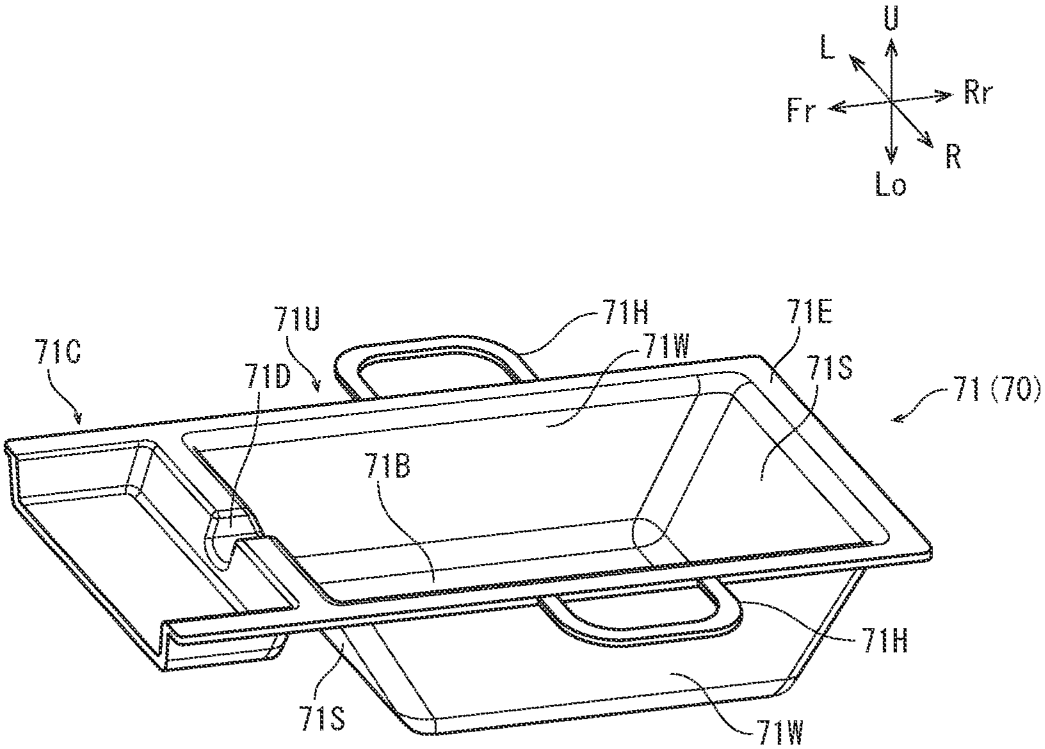
FIG. 11 is a perspective view showing the first member provided with a grip part according to a modified example of the embodiment of the present disclosure.

FIG. 11 is a perspective view showing the first member 71 with a gripping part 71H. In this modified example, in addition to the configuration of the above embodiment, the grip part 71H into which finger can be inserted are provided at the left and right edge parts 71E of the first member 71. The gripping part 71H may be integrally formed with the first member 71 using the same material as the first member 71, or may be connected to the first member 71 via a hinge (not shown). In addition to the first member 71, the second member 72 may be provided with the gripping parts 72H (not shown) of the same shape. By joining the gripping part 71H of the first member 71 and the gripping part 72H of the second member 72 with an adhesive tape or the like, the ink pack 35 can be carried more safely.

In the above embodiments, the shape of the first member 71 and the shape of the second member 72 are identical, but the shape of the first member 71 and the shape of the second member 72 need not be identical. For example, a portion covering the front surface of the pack connection part 44 may be provided in the second member 72. With this configuration, the front surface of the pack connection part 44 can be protected.

The invention claimed is:

1. A cushioning member for an ink pack including a spout for discharging ink and a pack connection part provided at a tip of the spout and connectable to an ink supply device, the cushioning member comprising:

a first member having a first recess shaped along a lower portion of the ink-filled ink pack, an edge part provided around the first recess and projecting outward in a horizontal direction, a spout storage part shaped along a lower portion of the spout, a connection part storage part shaped along a lower portion of the pack connection part, and a reinforcing rib provided on a lower surface of the edge part and connecting an outer surface of the first recess and an outer surface of the connection part storage part, and the second member having a second recess shaped along an upper portion of the ink-filled ink pack, an edge part provided around the second recess and projecting outward in a horizontal direction, a spout storage part shaped along an upper portion of the spout, a connection part storage part shaped along an upper portion of the pack connection part, and a reinforcing rib provided on an upper surface of the edge part and connecting an outer surface of the second recess and an outer surface of the connection part storage part, the ink pack is stored in a space formed by facing the first recess and the second recess, and the ink pack is attached to the ink supply device in a state where the ink pack is placed on the first member.

2. An ink supply device comprising:

a cushioning member for an ink pack including a spout for discharging ink and a pack connection part provided at a tip of the spout and connectable to an ink supply device, wherein the cushioning member includes:

a first member having a first recess shaped along a lower portion of the ink-filled ink pack; and a second member having a second recess shaped along an upper portion of the ink-filled ink pack, wherein the ink pack is stored in a space formed by facing the first recess and the second recess, and the ink pack is attached to the ink supply device in a state where the ink pack is placed on the first member, the ink supply device includes an attachment part shaped along an outer surface of the first member of the cushioning member, and when the first member on which the ink pack is placed is attached to the attachment part, the pack connection part of the ink pack is connected to the ink supply device, the pack connection part of the ink pack has a convex part and a hole part, and the ink supply device includes a hole part into which the convex part of the ink pack is inserted and a pin which is inserted into the hole part of the ink pack when the first member on which the ink pack is place is attached to the attachment part.

* * * * *